Sept. 6, 1960 C. K. BUTLER 2,951,771
METHOD FOR CONTINUOUSLY FABRICATING AN IMPERVIOUS
METAL COATED FIBROUS GLASS SHEET
Filed Nov. 5, 1956 2 Sheets-Sheet 1
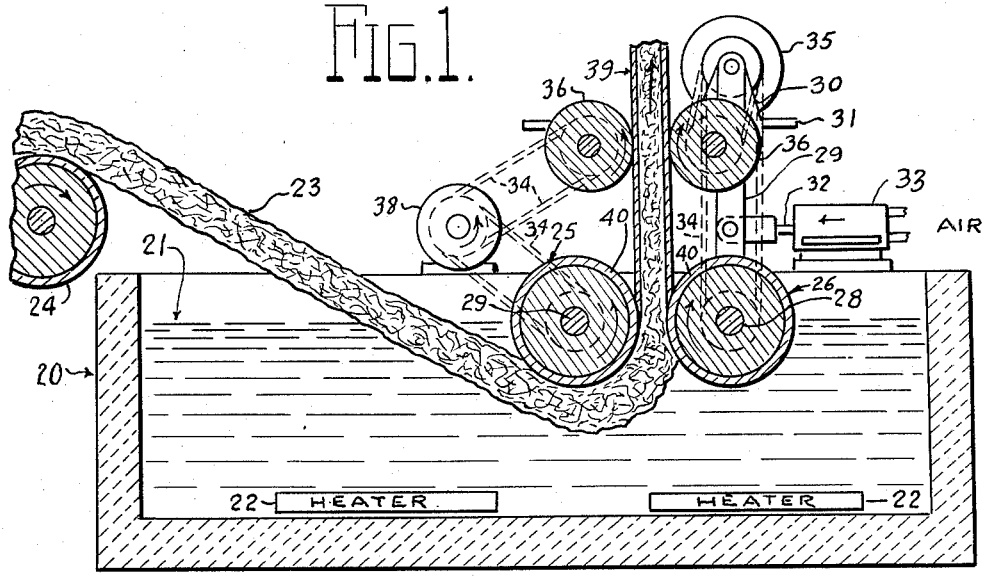
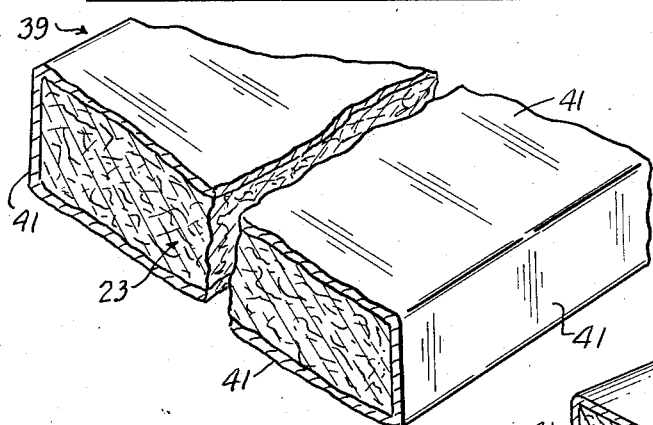
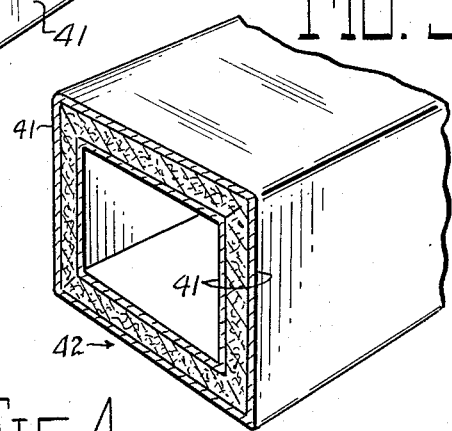
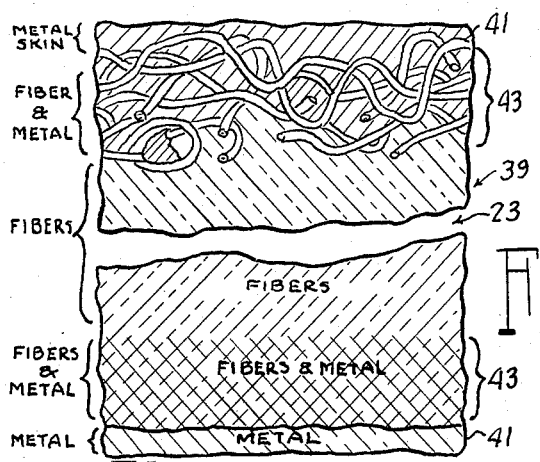
INVENTOR.
Charles K. Butler
BY
ATTORNEYS Sept. 6, 1960  C. K. BUTLER  2,951,771
METHOD FOR CONTINUOUSLY FABRICATING AN IMPERVIOUS
METAL COATED FIBROUS GLASS SHEET
Filed Nov. 5, 1956  2 Sheets-Sheet 2
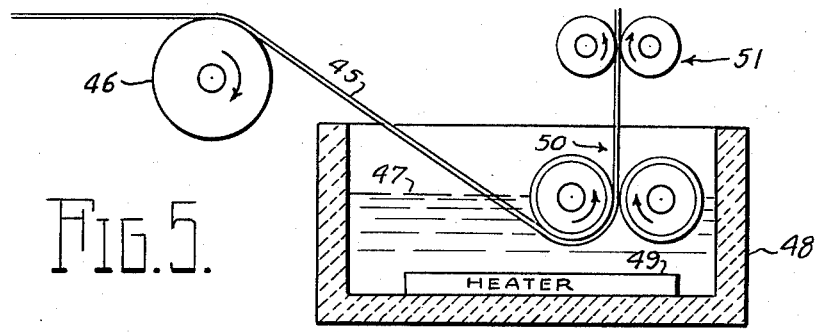
FIG. 5.
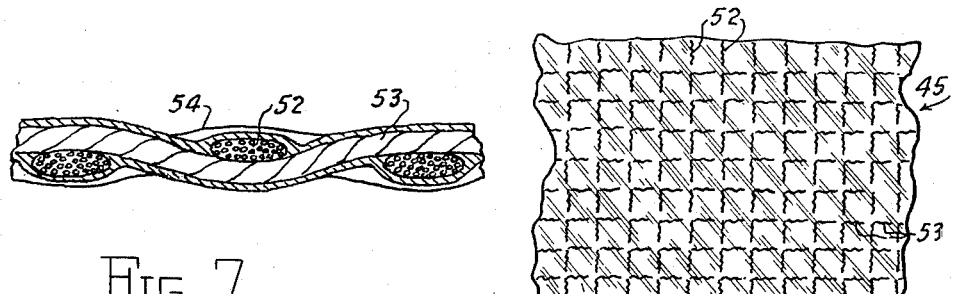
FIG. 7.  FIG. 6.
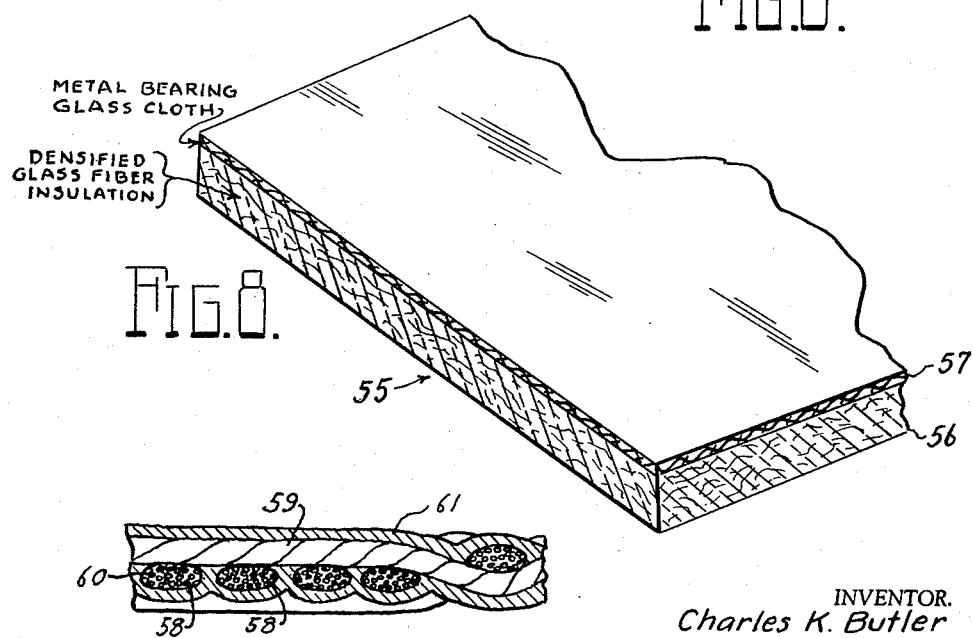
FIG. 8.
FIG. 9.
INVENTOR.
Charles K. Butler
BY
ATTORNEYS United States Patent Office 2,951,771
Patented Sept. 6, 1960

2,951,771
METHOD FOR CONTINUOUSLY FABRICATING AN IMPERVIOUS METAL COATED FIBROUS GLASS SHEET

Charles K. Butler, Riverside, Calif., assignor to Owens-Corning Fiberglas Corporation, a corporation of Delaware Filed Nov. 5, 1956, Ser. No. 620,239

4 Claims. (Cl. 117—114)

This invention relates to a method for the continuous fabrication of an impervious metal coated fibrous glass sheet and particularly to sheet and board-like products consisting of fibrous glass completely coated and/or partially impregnated with metal.

Many sheet, board and blanket-like masses of fibrous glass are used for the purpose of insulation as, for example, in the walls of buildings, in covering duct work, in roofs, in crawl spaces, etc. It has been discovered that the effectiveness of such insulation is greatly enhanced if it is combined with an effective vapor barrier. Its effectiveness is further improved by the combination with radiant heat reflecting material such as aluminum foil. Therefore, in many installations the sheet, board or blanket-like mass of fibers is covered with thin aluminum foil which functions both as a vapor barrier and as a radiant heat reflector.

Some disadvantages of the combination of aluminum foil with glass fibers have been experienced. Where the fibers are densified as, for example, by the compression of a blanket-like mass to form what is loosely called a "board," the thermal expansion of the aluminum varies from that of the fibrous mass to such an extent that the aluminum may buckle when subjected to heat and may split when subjected to cold. When the aluminum foil is to be handled with a combination of loose, fluffy mass of fibers such as in conventional household insulation, some difficulty is encountered in adhering the aluminum foil to the fibers.

In the fabrication of light, thin sheet material comprising glass fibers and aluminum, for example aluminum coated cloth, it has been suggested that the aluminum be combined with the glass fabric by vapor deposition. Flexible projection screens have been made in this way as have radiant heat reflecting fabrics for heavy winter clothing and other uses.

The present invention comprises a process wherein various blanket or sheet-like masses of fibers of different densities and thicknesses may be provided with an impervious coating and/or partially impregnated with metal, for example aluminum, so as to directly convert the fibrous glass mass to a finished composite metal and glass article on a continuous basis.

This object of the present invention and other objects and advantages will be better understood from the following specification and from the attached drawings in which:

Fig. 1 is a somewhat diagrammatic fragmentary view in vertical section of apparatus for carrying out the process of the invention in the fabrication of a glass fiber sheet having an impervious metal coating such as a blanket-like or board-like insulating material.

Fig. 2 is a fragmentary view partly in section and partly in perspective showing a piece of a finished product as produced according to the process of the instant invention.

Fig. 3 is a fragmentary view in perspective and partly in section showing an insulated duct fabricated from a board-like product made according to the invention and usable, for example, as an air conditioning duct.

Fig. 4 is a greatly enlarged, fragmentary, vertical sectional view somewhat diagrammatic in nature and illustrating how a product made according to the invention may constitute a three-phase system comprising fibers alone, fibers and metal and metal alone which constitutes an impervious coating, with air present in the interstices between the fibers in the fibrous portion of the structure and in some of the spaces in the fiber and metal portions of the structure.

Fig. 5 is a simplified view similar to Fig. 1 showing the fabrication of a thin, flexible glass fiber sheet having an impervious metal coating by the practice of the process of the instant invention.

Fig. 6 is a fragmentary, plan view illustrating a product produced according to the invention and comprising an open mesh fabric and an impervious coating of metal.

Fig. 7 is a fragmentary, greatly enlarged view in section of a portion of the composite article shown in Fig. 6.

Fig. 8 is a fragmentary view in perspective and partly in section illustrating a composite article comprising a mass of fibrous glass material combined with a glass fiber sheet having an impervious metal coating according to the invention, the whole being peculiarly adapted for the insulation and finishing of a surface such as a roof or deck.

Fig. 9 is a greatly enlarged, fragmentary, sectional view of a portion of a composite article comprising a tightly woven fabric having an impervious metal coating.

In operating according to the present invention apparatus such as that illustrated in Fig. 1 may advantageously be employed. In Fig. 1 there is shown a suitable tank generally indicated at 20 and illustrated as consisting of ceramic material in which there is maintained a pool of molten metal indicated at 21 that is kept at the proper temperature by suitable heaters 22. The metal in the tank 20 may, for example, be an aluminum alloy with which it is desired to coat a mass of fibrous glass for the production, say, of a composite aluminum glass board or sheet.

A continuous blanket of fibrous glass indicated at 23 is fed over an idler roller 24 downwardly into and beneath the surface of the bath of metal 21. The mass of glass 23 in this illustration is a blanket of blown fibers unified and adhered together by a binding agent such as phenol formaldehyde resin and having an apparent density substantially less than that of the desired finished product. The web of the fibrous glass mat 23 is led downwardly beneath the surface of the metal 21 and around a roller 25 which is one of a pair of feeding and compression rollers 25 and 26. The two rollers 25 and 26 are mounted upon transverse shafts 27 and 28 so positioned that their axes lie approximately in the plane of the upper surface of the bath of metal 21. The shaft 27 is journalled in suitable fixed bearings (not shown) and the shaft 28 is carried by movable bearings illustrated as being mounted in the lower end of a pair of arms 29. The arms 29 are pivoted in ears 30 on an upper framework 31 and connected by at least one rod 32 to an air cylinder 33 or other means for asserting controlled pressure on the shaft 28 to squeeze the roller 26 toward the roller 25. The rollers 25 and 26 are illustrated as being driven by belts 34 from a drive motor 35.

The blanket of fibrous glass 23 is led between the nip of the rollers 25 and 26 and, by control of the pressure asserted by the air cylinder 23, the rollers 25 and 26 are squeezed together to densify the mass of glass 23 and to displace air from between the fibers making up the mass of glass 23 to allow its replacement by molten metal from the pool 21.

It has been found that by densifying the mass of glass 23 beneath the surface of the pool of metal 21 air is displaced from the interstices between the fibers and metal forced thereinto over at least the surface area of the mass of glass 23 resulting in the formation of an impervious metal layer on the exterior of the mat 23. The depth of penetration of the metal into the interstices of the blanket of glass 23 depends upon the surface tension of the metal in the pool 21, its constituency, the presence or absence of fluxes, alloys, etc., surface characteristics of glass fibers making up the mass of glass 23 and other conditions, some well known in the art, and some discussed below.

The blanket of glass fibers 23 is compacted by compression between the pressure rollers 25 and 26 and fed upwardly therefrom by a pair of feeding rollers generally indicated at 36 which are driven through the medium of belts 37 by a second drive motor 38. The feeding rollers 36 may, of course, be driven from the same source of power as the compression rollers 25 and 26 and they may have proper surface treatment to provide for sufficient friction with the metallic skin of the finished composite article generally indicated at 39.

In order to prevent the molten metal in the bath 21 from adhering to and coating the rollers 25 and 26, it is desirable that they be fabricated from some material which the metal will not wet or that they be provided with a surface coating to prevent damage. In the case of molten aluminum, an aluminum oxide coating may be formed on the rollers before use or they may be glazed, for example, with cobalt glass. Such a coating is indicated at 40 in Fig. 1.

Fig. 2 is a fragmentary, enlarged view, partly in section and partly in perspective of a portion of a finished article 39 after it leaves the apparatus of Fig. 1 and has been fabricated according to the invention. The central mass of fibrous glass 23 is illustrated as being coated upon all four sides by a thin but impervious layer of metal 41.

In Fig. 3 there is shown a rectangular duct work generally indicated by the reference number 42 and particularly designed for use as an air conditioning conduit. The duct 42 may be fabricated from a single wide length of the finished article 39 or from four narrower lengths that have been assembled. The presence of the impervious metallic skins 41 on both the inner and outer surfaces of the duct work is particularly useful since it provides for both a vapor barrier and for the reflection of radiant heat so as to maintain conditioned air in the duct 42 with minimum changes in relative humidity and temperature.

Fig. 4, which is diagrammatic in nature, illustrates how the process of the instant invention provides the composite article 39 with impervious metal skins 41, the central mass of fibrous glass 23 and multiple phase areas generally indicated by the brackets 43 wherein glass fibers and metal are interspersed with the glass fibers embedded and mechanically bonded to the metal that is forced into at least part of the interstices between the fibers. It will be appreciated that, starting with the metal skin 41, the relative percentage of metal and glass present shades from 100% metal–0% glass in the skin 41 to 0% metal–100% fibers in the interior of the glass blanket 23. It will also be appreciated that air is present in many, if not all, of the interstices between the fibers in the central mass 23 and is present in less and varying amounts in some of the interstices between the fibers in the areas 43. Some air may even be trapped within the metal skin 41 as the air is driven out from between the fibers by the pressure from the rollers 25 and 26 and as the metal forming the skin 41 replaces it.

By thus intimately associating the metal and fibers together, a definite mechanical bond is created between the metal forming the impervious, vapor-proof and radiant heat reflecting skin 41 and the fibers in the areas 43 which are integrated and bonded to the fibrous mass in the interior. The insulating properties of the fibrous mass of glass with its multiplicity of air filled interstices is not derogated by the presence of metal in the external portions of the entire composite article 39. An integral composite article having the properties of thermal insulation, vapor barrier and radiant heat reflection is thus produced without the necessity for separate fabricating and adhesion steps. By reason of intimate intermingling of metal and fibrous glass the unity of the structure is strengthened by the presence of the glass and the deleterious effects of the differences in the coefficients of expansion of the metal and glass are minimized or virtually eliminated.

Fig. 5 is a simplified diagrammatic view illustrating the process of the invention as carried out for the combining of metal with glass in the form of a fabric woven from glass fiber yarns or strands to result in an impervious coating of metal on the fabric. A length of fabric 45 is fed over a guide roller 46 and downwardly into a bath of metal 47. The bath 47 is shown as being maintained in a suitable tank 48 and held in molten condition by a heater 49. The sheet of fabric 45 is led around one of a pair of pressure rollers 50 and thence between a pair of feeding rollers 51. The pressure rollers 50 are illustrated as being mounted with their axes lying at least approximately in the plane of the upper surface of the pool of metal 47. The rollers 50 are not shown in detail in Fig. 5 nor is there illustrated any mechanism for squeezing them together with a controlled pressure. However, as in the case of the operation as performed with continuous wool-like fibers on the apparatus illustrated in Fig. 1, such means probably would be employed. In handling a sheet of continuous woven fabric, however, the purpose of the pressure rollers 50 is only to cause the exudation of at least a portion of the air trapped between the individual filaments of each strand or yarn. Because a sheet of woven fabric is relatively dense and cannot be appreciably compacted without injuring the fibers from which it is woven, the pressure rollers 50 are not relied upon to densify the continuous fabric 45 as are the pressure rollers 25—26 of Fig. 1.

Fig. 6 is a fragmentary, plan view illustrating a portion of a piece of the fabric 45 as coated with an impervious metal layer according to the process of the invention. The particular fabric illustrated in Fig. 6 is a so-called "open-mesh" fabric, woven from spaced warp threads or yarns 52 and spaced woof threads or yarns 53 (see also Fig. 7). The generally square or rectangular openings through such a fabric, i.e., the openings between the warp and woof threads 52 and 53 are filled in with metal as the fabric emerges from the bath 47 between the pressure rollers 50. As can better be seen in Fig. 7, the composite article is thicker where the threads 52 and 53 cross each other, the metal being thinned out between the threads or yarns 52 or 53 by its surface tension which results in giving the fabric a "waffle-like" surface appearance.

The composite article comprising the woven glass fiber fabric 45 and metal from the pool 47 may be likened to a sheet of metal foil having an internal reinforcing network. Although not readily apparent because of the scale involved, the metal does not penetrate between the individual filaments from which the threads or yarns 52 or 53 are twisted. It penetrates partly between the surfaces of the exterior ones of the individual filaments and thus creates a tight mechanical bond with the threads or yarns 52 and 53. The fabric is not in the true sense "impregnated" but its individual components are coated and bonded to the overall continuous and impervious mass of metal generally indicated at 54 in Fig. 7.

Fig. 8 shows a slab of roof deck material generally indicated at 55 comprising a mass of highly densified glass fiber insulation 56 to which has been adhered a surface layer 57 which is a composite article fabricated according to the invention and which is designated by the slogan "metal-bearing glass cloth" to indicate that the glass cloth 45 is not impregnated with the mass of metal 54 but combined therewith as a composite article having an impervious metal coating. Adhesion between the glass metal composite 57 and the densified mass of glass fibers 56 may be achieved through the use of suitable adhesives well known in the art or by passing the two masses of sheet material between pressure rollers and subjecting them to sufficient heat to soften the metal in the composite article 57 so that it forms a mechanical bond with at least some of the surface fibers in the densified glass fiber insulation board 56.

Adhesion between glass fibers and aluminum, which is particularly suitable for use in the fabrication of insulation and heat reflecting sheet material according to the invention, has been found to be enhanced by the utilization of a very small quantity of silver. It has been discovered that if silver is vapor-deposited upon a woven glass cloth and the coated glass cloth is then treated according to the above outlined steps of the invention, adhesion between the individual elements of the glass cloth and the overall metal mass is improved. It has similarly been discovered that if 1% by weight of silver is added to an aluminum alloy melt, adhesion between the aluminum alloy and the glass fibers whether in the form of a bat or mat as in Fig. 1, or a woven fabric as in Fig. 5, is definitely improved.

Although the process of the invention is illustrated in the figures as usable for the combination of metal with relatively open glass fibers sheet materials, i.e., relatively low density wool and open-mesh mass fabric, the degree of openness is relatively immaterial in the practice of the invention. A tightly woven fabric wherein the individual yarns or threads lie closely adjacent each other may also be readily combined with metal according to the practice of the invention. Even in such cases the interstices between the surface filaments of the threads or yarns and the spaces between the adjacent threads or yarns are very large and readily penetrated by the molten metal. Such a situation is generally indicated in Fig. 9. In this figure closely spaced threads 58 and 59, each consisting of several hundred individual glass filaments 60 are shown as combined with a mass of metal generally indicated at 61. As can be seen in the portions between any two threads or yarns 58 the metal flows in between the threads or yarns and between the external ones of the individual filaments 60 to provide a secure mechanical bond and an impervious surface layer of metal.

Those familiar with the art will realize that the process of the invention is restricted to the fabrication of composite metal and glass articles from metals and glasses which can be combined in the manner shown. The melting point of the metal to be combined with the glass must, of course, be lower than what will be called the "fusion temperature" of the glass itself. While the glass may be softened slightly at the temperature of the metal bath it must not be so fused as to lose its structural integrity. Since the softening of the glass is a relative process and since with each increase in temperature the viscosity of the glass fibers becomes less, it is impossible to set forth any precise temperatures at which the practice of the invention may be carried out. Experiments will be necessary with respect to any particular glass of any particular composition and the combination of that glass with any particular metal or metal alloy. It can be said, however, that conventional glasses employed for the fabrication of fibrous glass wool or glass fiber textiles are not harmed or softened to too great an extent by their immersion in molten aluminum or lead or other metals, including alloys thereof, which melt at similar temperatures.

It also will be appreciated that, while no such mechanism is shown in the drawings, any conventional means may be employed for introducing new metal into the pools or baths 21 or 47 as metal is withdrawn therefrom to maintain the baths 21 or 47 at more or less constant levels as well as for maintaining the temperatures of the baths 21 or 47 at more or less constant levels.

I claim:

1. A method for fabricating a fibrous glass sheet having an impervious metal coating, said method comprising maintaining a pool of molten metal at a temperature less than the fusion temperature of the glass to be combined therewith, longitudinally feeding a continuous sheet-like mass of glass fibers through at least a portion of said pool, applying continuing mechanical pressure in addition to the pressure applied by the metal in the pool and in a direction normal to the opposite main faces of said mass of fibers while immersed in said pool for forcing some of the metal in said pool into intimate surface contact with at least the exterior ones of the glass fibers in said mass and into and filling surface interstices in said mass for forming an impervious surface layer thereon and withdrawing said mass continuously from said pool.

2. A method according to claim 1 including withdrawing said mass of fibers upwardly out of said pool of metal and applying maximum mechanical pressure to the opposite main faces of said mass of fibers in a direction normal thereto and at about the level of the surface of said pool of molten metal.

3. A method according to claim 1 including the steps of maintaining a pair of pressure rolls immersed in said pool to about the level of their axes, urging said rolls toward surface contact with one another, and leading said mass of fibers upwardly out of said pool between the surfaces of said rolls for densifying said mass of fibers while immersed in said pool and for filling the surface interstices thereof with the molten metal and spreading an impervious surface layer of metal thereover.

4. A method for fabricating an aluminum coated continuous sheet-like mass of glass fibers, said method comprising maintaining a pool of molten aluminum alloy comprising about one percent silver at a temperature less than the fusion temperature of the glass fibers to be associated therewith, longitudinally feeding a continuous, relatively low density mat of integrated glass fibers into said pool and beneath the surface thereof, applying mechanical densifying pressure to said mass of fibers by compressing the same between force applying means acting normal to the opposite main faces thereof while immersed in said pool for forcing the metal into and filling the surface interstices of said mass of fibers and simultaneously leading said mass of fibers out of said pool.

References Cited in the file of this patent

UNITED STATES PATENTS

| | | |
|---|---|---|
| 631,366 | Golding | Aug. 22, 1899 |
| 1,574,188 | Friedman | Feb. 23, 1926 |
| 1,856,475 | Frost | May 3, 1932 |
| 2,401,374 | Sendzimir | June 4, 1946 |
| 2,583,855 | Kenis | Jan. 29, 1952 |
| 2,592,282 | Hodil | Apr. 8, 1952 |
| 2,616,165 | Brennan | Nov. 4, 1952 |
| 2,698,812 | Schladitz | Jan. 4, 1955 |